INVENTORS
KARL GÜRS
DIETER ROSENBERGER

ATTORNEY

United States Patent Office 3,496,485
Patented Feb. 17, 1970

3,496,485
HOLE-BURNING EFFECT REPRESSION IN A GAS LASER
Karl Gürs and Dieter Rosenberger, Munich, Germany, assignors to Siemens Aktiengesellschaft, Erlangen, Germany, a corporation of Germany
Filed Aug. 24, 1964, Ser. No. 391,472
Int. Cl. H01s 3/09, 3/22
U.S. Cl. 331—94.5                               7 Claims

ABSTRACT OF THE DISCLOSURE

In a gas laser operation the active emitting gaseous medium, to suppress the hole-burning effect, thereby increasing the efficiency of the laser process, is subjected to an alternate electric or magnetic field of which the period is short relative to the relaxation time involved in the effect to produce a shift in the laser output frequency, and the frequency shift approximates the line width. Use of an appropriate applied magnetic field or electromagnetic wave as the alternating field provides both the suppression effect and also the necessary pumping. By amplitude modulation of such applied field, the degree of suppression apparent in the output is varied, thus affording a modulation of the laser output.

---

Figure 1:
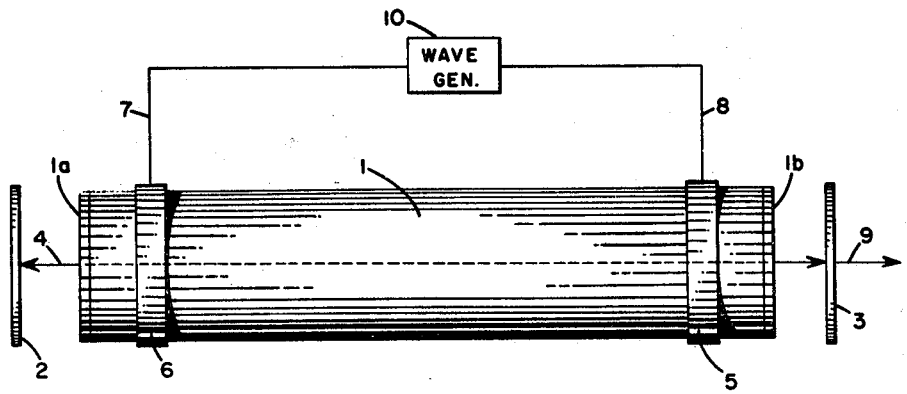

The present invention relates to a device and method for generating and amplifying electromagnetic radiation in accordance with the maser or laser principle.

Laser systems to generate electromagnetic radiation are already fairly well known in the art. These systems are based upon the familiar principle of stimulated emission. The stimulated emission arises out of emission of a radiation quantum by an excited atom or molecule when this molecule is situated in an external field of radiation. This field must have the same properties as the field of the emitted quantum. The emission of the radiation quantum is thus related to the presence of the radiation field. It is entirely possible, however, that excited atoms or molecules may undergo spontaneous emission. In this case, however, the presence of a field of radiation is of no significance insofar as the emission is concerned.

The advantageous qualities of stimulated emission are quite well known, particularly that they can be used to generate and/or amplify coherent electromagnetic radiation. To establish such emission in a laser system, materials generally referred to as laser responsive, or active, are utilized. The atoms or molecules of these materials must possess energy transitions which are equal to the quantum energy of the desired electromagnetic radiation emitted by the laser system.

The line-width of spontaneous emission in any laser responsive material, whether solid, liquid or gaseous, is appreciably greater than the width of a line generated in the given material by stimulated emission. In laser active gases line broadening is mainly due to the Doppler effect, i.e. the movement of molecules or atoms in the gas, or gas mixture. The total spectrum of stimulated emission in a laser consists, generally, of several emission lines congregated fairly close together and representing the different modes of oscillation of the laser resonator. More specifically and by way of example, in a gas laser the line width is of the order of magnitude of 1 cycle/sec., while the width of the line created by spontaneous emission is $10^9$ cycles/sec.

Distortions have been observed in the profile of the fluorescent line generated by stimulated emission. Such distortions appear in the form of sudden dips, particularly in gas lasers, and are universally referred to as the "hole-burning effect." The term "line profile" of the fluorescent line is used herein to denote the intensity of fluorescent radiation plotted against frequency. The "hole-burning effect" is apparently due to the fact that excited laser active atoms are able to emit laser radiation in the resonator at only certain frequencies of the fluorescent line. The momentarily increased de-excitation of atoms or molecules, which are able to radiate quanta with exactly the energy of the line emitted by the resonator, causes this attenuation of the laser emission. As a result a condition may occur in which spontaneous emission will exceed the stimulated emission. It is obvious that spontaneous emission of atoms or molecules is an undesired and wasteful factor in a laser operation. One very pronounced disadvantage is that the energy pumped into the laser active material is obviously not transformed into stimulated emission and, hence, the efficiency and output of the laser is reduced.

It is therefore the primary object of this invention to provide a laser having improved radiation characteristics.

It is another object of this invention to provide a laser in which distortions normally appearing in the line profile of the fluorescent emission line have been eliminated.

It is a more specific object of this invention to provide a laser in which the problems and disadvantages associated with the "hole-burning effect" are avoided.

It is another object of this invention to provide a laser employing an alternating field with a predetermined frequency to overcome the "hole-burning effect."

It is still another object of this invention to provide a laser utilizing an alternating field to overcome the "hole-burning effect" as well as to provide means to excite the laser active medium.

An aspect of the present invention resides in the method of generating and/or amplifying electromagnetic radiation by stimulated emission according to the laser principle. The method includes providing a resonator structure and placing thereinto a laser responsive material with a plurality of energy levels. Wave energy is pumped into and through the laser active material to produce population inversion to establish an output of electromagnetic radiation by stimuated emission. The laser material is placed into an alternating field which has a period relatively short compared to the relaxation time of a distortion in the line profile of the fluorescent emission line of the laser material.

Another aspect of the present invention resides in the disclosed laser device itself whereby such method may be carried out.

For a better understanding of the present invention and further objects thereof, reference is had to the following description taken in connection with the accompanying drawings, and their scope will be pointed out in the appended claims.

Figure 2:
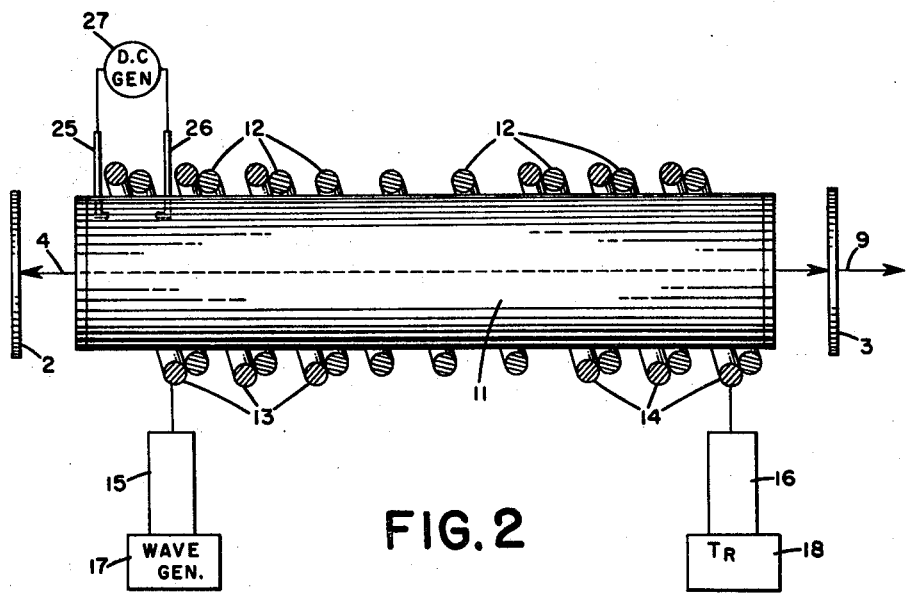

FIGURE 1 shows a side view of an illustrative form of a laser in accordance with this invention; and FIGURE 2 is a view similar to FIGURE 1, illustrating a modified and specific application of the invention.

Referring now to the drawing, there is shown in FIGURE 1 a laser which is constructed of a tube 1 formed of electrically insulating material and closed at each end with suitably oriented windows 1a and 1b. The tube is filled with or contains a laser active or responsive medium, in a liquid or gaseous state. The tube 1 is herein generally referred to as a cavity resonator or resonator structure. In the prior art numerous laser active materials are known, for example, a helium-neon gas mixture and a solid state body such as a ruby. For the latter type, however, the structural form of the resonator is of a different but known nature. Axially spaced from each end of the tube are a pair of reflectors 2 and 3 of the type normally in use in Perot-Fabry interferometers. There is also provided some conventional means for generating and pumping wave energy into and through the laser active medium to produce population inversion therein to effect stimulated emission of coherent radiation. A number of excitation mechanisms have lately become known. For a gas laser operation, for instance, pumping by gas discharge is one of the known expedients. Other methods and apparatus therefor are described in Applied Optics, Supplement 1, Optical Masers, 1962, a publication of the Optical Society of America.

In accordance with this invention, a pair of ring-like electrodes 5 and 6 surround the tube 1 and are located remote from each other to set up therebetween an alternating field having characteristics hereafter further delineated. The field is generated by a wave generator 10 suitably coupled to the electrodes 6 and 5 by conducting cables 7 and 8 respectively. The generator 10 is of a construction permitting adjustment of the frequency as well as modulation of the intensity of the field. The alternating field, which may be electric or magnetic, here in FIGURE 1 is electric. In order to obtain a greater field strength, it is possible to use a plurality of electrodes (not shown) mounted at shorter intervals along tube 1. The connections for such electrodes may be the same as for electrodes 5 and 6.

The beam axis 4 between the reflectors 2 and 3, as indicated, denotes the path of the radiation generated and amplified by the device of this invention, which is to say that the radiation travels back and forth between the reflectors in the laser responsive medium. A portion of this radiation is emitted as coherent radiation, see 9, through partially transparent reflector 3.

Improvement in the emission and ultimately in the radiation is accomplished by selecting and operating the alternating field in a manner effective to inhibit the formation of distortions, particularly of the so-called "hole burning effect" type, in the line profile of the fluorescent line. A number of criteria must be observed. The alternating field, in which the laser responsive medium is placed, should have a period which is short as compared to the relaxation time of any distortion, or sudden dip, of the fluorescent line profile in the laser active material. The term "relaxation time of a distortion of the line profile" is used herein to denote the time constant for the natural decay of the distortion, or dip, after the perturbation, normally the laser oscillation itself, has been suppressed.

The present invention is based upon the concept that, under conditions of a constant frequency of radiation, generated and amplified by stimulated emission and emitted by the laser, it is possible to avoid these distortions in the fluorescent line profile by continuously shifting its frequency. It is known that such a shift in frequency may be obtained by application of an electric or magnetic field producing respectively the "Stark" or "Zeeman" effects.

Thus experiments have shown, that when the period of the alternating field is correctly chosen, the distortion in the fluorescent line profile vanishes. The extent of frequency shift has to be greater than the width of the sudden dip, or distortion, in the line profile caused by "the hole-burning effect." This width is approximately equal to the natural line width. In a case where only a few laser lines are emitted, for instance in a gas laser, it is desirable to choose a frequency shift approximately equal to the width of the fluorescent lines. The extent of the frequency shift itself is determined by the effective field strength of the electric or magnetic alternating field within the laser active material.

The relaxation time referred to above, can be readily determined by a simple and fairly accurate method as follows. The frequency of the alternating field is increased and at a certain frequency it will be observed that the manifestation of the "hole-burning effect" will vanish, that is the output intensity of the laser radiation will increase. For gases the relaxation time is of the magnitude of about $10^{-6}$ to $10^{-7}$ seconds. Hence, the alternating field must have a corresponding frequency of about 1 to 10 megacycles/sec.

Under certain conditions, it may be advantageous to select the high frequency for the alternating field so that its period is short compared to the time the laser radiation requires to travel once back and forth or around, within the resonator. Preferably, the frequency is selected so that the traveling time is different from any integral multiple of the period of the alternating field. This is particularly desirable either if the traveling time of the radiation in the resonator is short, for instance if the laser resonator is small, or if the Q-value of the resonator is poor, which is to say that laser radiation which is amplified in the resonator remains only a very short period therein.

In many instances it is also possible to modulate the radiation emitted by the laser by changing the strength of the alternating field of this invention. Shifting or splitting of the energy levels of the laser active medium in greater or less degree by an electric or magnetic field having a variable amplitude of field strength appears to repress more or less the develropment of the "hole-burning effect." The attainable modulation frequencies of this system are of an order of magnitude of megacycles/sec. and are determined, among other factors by the limiting frequency of the so-called "inner modulation of a laser resonator."

FIGURE 2 illustrates another application of the present invention. Herein, the alternating field as above described serves a double function, i.e. to avoid the distortions in the fluorescent line profile due to the "hole-burning effect" as well as to effect excitation of a laser active gas or gas mixture. A laser system of the latter type is described in co-pending U.S. Application S.N. 362,053 filed Apr. 23, 1964 and assigned to the same assignee as the present Referring now specifically to FIGURE 2, in which the same numerals denote identical components, there is shown a resonator tube 11, of the type above described, filled with a laser active gas such as neon. A helical coil 12 is concentrically mounted about the tube to function as a wave guide and delay line for an electromagnetic wave traveling along the wave guide in a direction parallel to the tube axis, i.e. the axis of laser emission. The wave is coupled and de-coupled from the wave guide 12 by a pair of coils 13 and 14, which are arranged remote from each other. A wave generator 17, or a device of similar nature, is suitably connected by way of coaxial cable 15 to the coil 13 while the coil 14, by way of coaxial cable 16, is coupled to a terminating resistor 18. A source for free electrons is provided within the tube by a pair of spaced electrodes 25 and 26 suitably connected to a D.C. generator 27. Alternatively, free electrons may be provided by high frequency discharge.

The electromagnetic wave is propagated along the wave guide delay line with a velocity considerably lower than the velocity of light, because the electromagnetic wave velocity has to be equal to the velocity required to be imparted to the free electrons, so as to confer a kinetic energy exactly equal to the excitation energy of the laser active material. For neon, the coil is to be chosen so that the speed of propagation is approximately $\frac{1}{100}$ of the velocity of light. This establishes a simple method for selective excitation, i.e. an inversion of population of two proper energy levels in the laser active gas by electron collision. Since inversion is normally difficult to achieve it may require a 4-level laser system, where the final level of the laser transition is not the ground state.

It is obviously advantageous to utilize the generator 17 to serve a double function, i.e., of providing an excitation mechanism while at the same time increasing the radiation output by eliminating distortions in the line profile of the fluorescent line caused by the "hole-burning effect."

While there have been described what are at present considered to be the preferred embodiments of this invention, it will be obvious to those skilled in the art that various changes and modifications may be made therein without departing from the invention, and it is, therefore, the intent of the appended claims to cover all such changes and modifications as fall within the true spirit and scope of the invention.

We claim:
1. A method of producing a laser beam from a gaseous laser responsive medium subject to the hole-burning effect represented by dips in the single-pass gain-frequency curve profile of the fluorescent emission line of the laser output, comprising:
   providing a cavity resonator and placing thereinto said gaseous medium;
   producing a population inversion by pumping energy into said gaseous medium and thereby laser radiation resulting in said beam;
   subjecting said gaseous medium in the region of population inversion and radiation to an alternating field having a period which is relatively short as compared to the relaxation time of a distortion in the line profile of the fluorescent emission line of said gaseous medium and having a field strength sufficient to repress the appearance of the said hole-burning effect; and modulating the intensity of said alternating field to effect an intensity modulation of said beam.

2. In the method according to claim 1, establishing said period to be shorter than the travel time required for said radiation to travel back and forth through the said laser responsive medium.

3. In the method according to claim 2, causing said last-mentioned travel time to differ from any integral multiple of the period of the alternating field.

4. In a method according to claim 1, establishing an electric field as the said alternating field.

5. In a method according to claim 1, establishing a magnetic field as said alternating field.

6. The method according to claim 1 establishing said period to be shorter than the travel time required for said radiation to travel back and forth through said laser responsive medium and establishing said travel time to be different from any integral multiple of the period of the alternate field.

7. A method as described in claim 1, further comprising
   establishing said alternating field as a traveling electromagnetic wave propagated through said medium in a direction parallel to a desired laser output beam direction; and
   wherein said population inversion is obtained by producing free electrons in said gaseous medium and pumping by establishing the propagation velocity of said traveling wave at the velocity, imparted to said free electrons, required to confer on said electrons kinetic energy equal to the excitation energy of said medium, whereby said gaseous medium is excited by electron-gas collisions.

References Cited
UNITED STATES PATENTS

| | | | |
|---|---|---|---|
| 3,149,290 | 9/1964 | Bennett et al. | 331—94.5 |
| 3,265,989 | 8/1966 | Gurs | 331—94.5 |
| 3,317,853 | 5/1967 | George | 331—94.5 |
| 3,277,396 | 10/1966 | Statz et al. | 331—94.5 |

OTHER REFERENCES

Wolff, Field Modulates Laser, Electronics, Apr. 26, 1963, pp. 26–27.

Melngailis et al., Applied Physics Letters, June 1, 1963, vol. 2, No. 11, pp. 202, 203, 204.

Kaiser et al., Appl. Phys. Letters, June 1, 1963, vol. 2, No. 11, pp. 206–208.

RONALD L. WIBERT, Primary Examiner

T. MAJOR, Assistant Examiner